(12) United States Patent
Zeng

(10) Patent No.: US 10,887,436 B2
(45) Date of Patent: Jan. 5, 2021

(54) CAMERA ASSEMBLY, ELECTRONIC APPARATUS AND MOBILE TERMINAL

(71) Applicant: GUANGDONG OPPO MOBILE TELECOMMUNICATIONS CORP., LTD., Guangdong (CN)

(72) Inventor: Zanjian Zeng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 39 days.

(21) Appl. No.: 16/188,598

(22) Filed: Nov. 13, 2018

(65) Prior Publication Data

US 2019/0166236 A1    May 30, 2019

(30) Foreign Application Priority Data

Nov. 30, 2017  (CN) .......................... 2017 1 1246192

(51) Int. Cl.
*H04N 5/225* (2006.01)
*H04M 1/02* (2006.01)

(52) U.S. Cl.
CPC ....... *H04M 1/0264* (2013.01); *H04M 1/0235* (2013.01); *H04M 1/0237* (2013.01); *H04N 5/2253* (2013.01)

(58) Field of Classification Search
CPC .......................... H04N 5/2257; H04M 1/0264
USPC ................................................ 348/373, 375
See application file for complete search history.

(56) References Cited

U.S. PATENT DOCUMENTS

| 2005/0014527 A1 | 1/2005 | Chambers et al. |
| 2005/0195499 A1 | 9/2005 | Makii et al. |
| 2006/0184593 A1* | 8/2006 | Cho ........................ G03B 17/02 708/100 |

(Continued)

FOREIGN PATENT DOCUMENTS

| CN | 101236353 A | 8/2008 |
| CN | 101355756 B | 10/2012 |

(Continued)

OTHER PUBLICATIONS

Chinese First Office Action and Written Opinion for related Chinese application No. 201711246192.4, dated May 21, 2020 (29 pages).

(Continued)

*Primary Examiner* — Anthony J Daniels

(57) ABSTRACT

A camera assembly may include a fixed holder, a support means including a first magnetic structure and configured to move relative to the fixed holder, a guiding rail arranged on the fixed holder, a sliding block arranged on the support means and configured to slide along the guiding rail to guide movement of the support means, a camera module arranged on the support means and configured to move between a first position at which the camera module extends out of the fixed holder and a second position at which the camera module retracts into the fixed holder with the movement of the support means, and a second magnetic structure arranged on the fixed holder and configured to generate repulsive force and attractive force to the first magnetic structure to drive the support means to move, such that the camera module moves between the first position and the second position.

20 Claims, 8 Drawing Sheets

(56) References Cited

U.S. PATENT DOCUMENTS

| | | |
|---|---|---|
| 2007/0279847 A1 | 12/2007 | Li et al. |
| 2009/0082074 A1 | 3/2009 | Chen |
| 2010/0124955 A1 | 5/2010 | Lin |
| 2017/0064166 A1* | 3/2017 | Xiong ................. H04M 1/0264 |
| 2017/0126979 A1 | 5/2017 | Evans et al. |
| 2017/0227731 A1* | 8/2017 | Eromaki ............ H02K 41/0354 |
| 2017/0280033 A1* | 9/2017 | Yu ........................... G03B 17/04 |
| 2018/0262663 A1 | 9/2018 | Zhang |
| 2019/0171252 A1* | 6/2019 | Hu ......................... G06F 1/1686 |
| 2019/0215389 A1* | 7/2019 | Yin ..................... H04M 1/0264 |
| 2020/0020471 A1* | 1/2020 | Luo ....................... G06F 1/1686 |

FOREIGN PATENT DOCUMENTS

| | | |
|---|---|---|
| CN | 103533222 A | 1/2014 |
| CN | 105187700 A | 12/2015 |
| CN | 105208149 A | 12/2015 |
| CN | 105430246 A | 3/2016 |
| CN | 105453526 A | 3/2016 |
| CN | 205725913 U | 11/2016 |
| CN | 206077465 U | 4/2017 |
| CN | 106657744 A | 5/2017 |
| CN | 106850896 A | 6/2017 |
| CN | 106856516 A | 6/2017 |
| CN | 106911883 A | 6/2017 |
| CN | 206251153 U | 6/2017 |
| CN | 206338556 U | 7/2017 |
| CN | 107071242 A | 8/2017 |
| CN | 206413083 U | 8/2017 |
| CN | 107197133 A | 9/2017 |
| CN | 207118136 U | 3/2018 |
| CN | 207354463 U | 5/2018 |
| WO | WO-2019015651 A1 * | 1/2019 .......... H04M 1/0264 |

OTHER PUBLICATIONS

Indian First Examination Report and Written Opinion for related Indian application No. 201814042611, dated Jul. 15, 2020 (6 pages).

Chinese Second Office Action and Written Opinion for related Chinese application No. 201711246192.4, dated Oct. 20, 2020 (29 pages).

\* cited by examiner

CAMERA ASSEMBLY, ELECTRONIC APPARATUS AND MOBILE TERMINAL

CROSS REFERENCE TO RELATED APPLICATIONS

This application claims priorities to Chinese Patent Application No. 201711246192.4, filed on Nov. 30, 2017, the contents of which are herein incorporated by reference in their entireties.

TECHNICAL FIELD

The described embodiments relate to electronic products, and in particular to a camera assembly, an electronic apparatus with the camera assembly and a mobile terminal with the camera assembly.

BACKGROUND

Front camera module of a current mobile terminal is covered by a screen. It is necessary to define a hole for the camera module on a glass substrate of the screen for light to penetrate through, that is, the front camera module may occupy a space of the screen. As a result, the ratio of a display area of the screen to an area of the screen is reduced, and it is difficult for the mobile terminal to achieve full screen.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
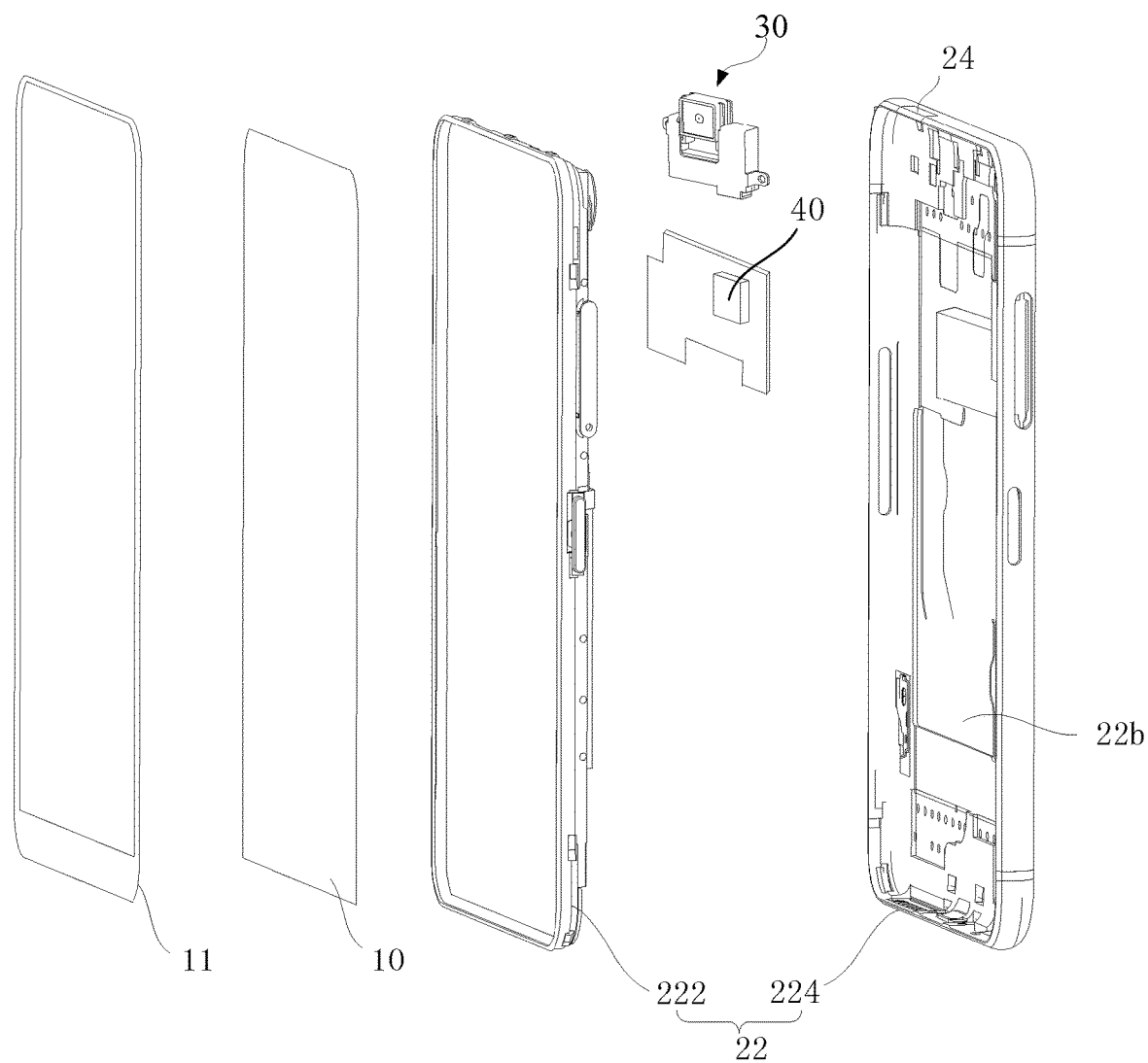
FIG. 1 is an exploded isometric view of an electronic apparatus according to an embodiment of the present disclosure.

In order to more clearly understand the objective, the features and advantages of the present disclosure, the present disclosure will be described in details with reference to the drawings and the embodiments. It should be noted that, the embodiments and the features recited in the embodiments of the present disclosure may be combined with each other without confliction.

Plenty of specific details are described in the embodiments in order to better understand the technical solution of the present disclosure. However, the embodiments described here are only some exemplary embodiments, not all the embodiments. Based on the embodiments described in the present disclosure, one skilled in the art may acquire all other embodiments without any creative work. All these shall be covered within the protection scope of the present disclosure.

Further, the embodiments are described with reference to the accompanying drawings, in order to illustrate specific embodiments of the present disclosure that can be implemented. In the specification, it can be understood that, directional terms recited in the present disclosure, such as "top", "bottom", "upper", "lower", "front", "rear", "left", "right", "inner", "outer", "side plate", "above", "under", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure. In the present disclosure, unless specified or limited, otherwise, terms "mounted", "connected", "coupled", "disposed", "arranged", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In addition, terms such as "first", "second", "third", and the like are used herein for purposes of description, and are not intended to indicate or imply relative importance or significance or to imply the number of indicated technical features. Thus, the feature defined with "first", "second", "third", and the like may include one or more of such a feature. In the description of the present disclosure, "multiple" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the said element.

In the following, an electronic apparatus 100 provided in embodiments of the present disclosure will be described with reference to drawings.

The electronic apparatus 100 may include intelligent devices such as tablet PCs, mobile terminals, cameras, personal computers, laptops, in-vehicle devices, wearable equipment, and the like. It should be understood that "electronic apparatus 100" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic apparatus 100 may also include a satellite or cellular telephone, a personal communication system terminal with cellular radio telephone and data processing, facsimile and data communication, beeper, or other electronic apparatuses with a transceiver.

Figure 2:
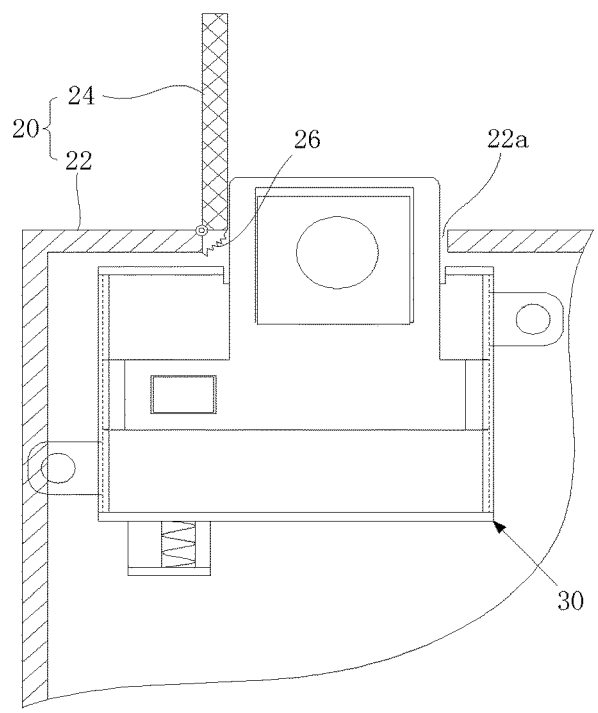
FIG. 2 is a partial cross-sectional view of the electronic apparatus according to an embodiment of the present disclosure.
Figure 3:
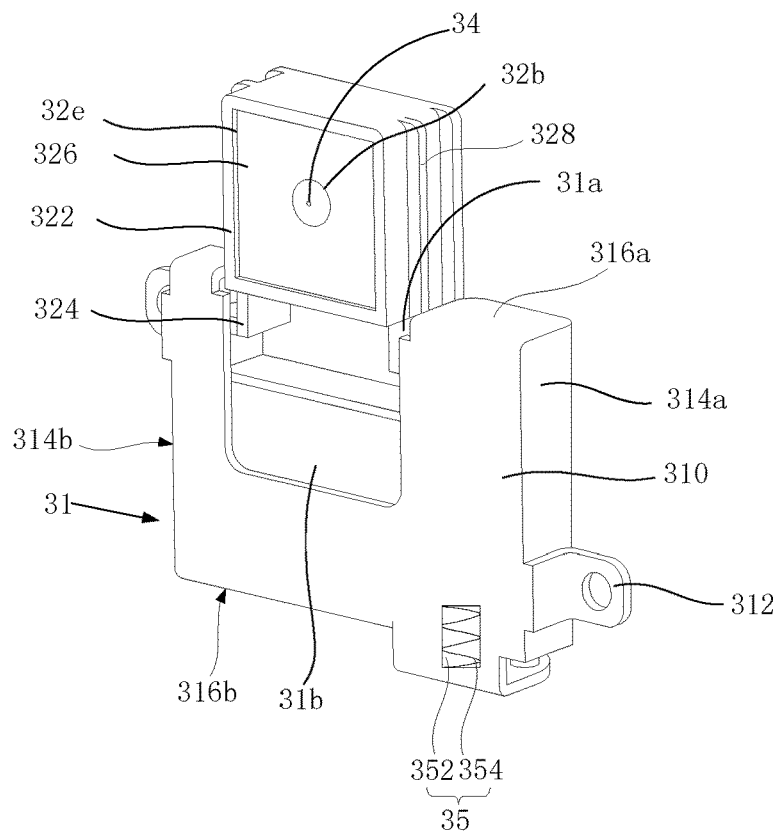
FIG. 3 is an enlarged view of a camera assembly in FIG. 1.

Referring to FIGS. 1 to 2, the electronic apparatus 100, according to an exemplary embodiment, may include a screen 10, a housing assembly 20, a camera assembly 30, and a controller 40 electrically connected to the camera assembly 30. The screen 10 may be embedded in the housing assembly 20. The camera assembly 30 and the controller 40 may be disposed in the housing assembly 10 and under the screen 10.

Figure 9:
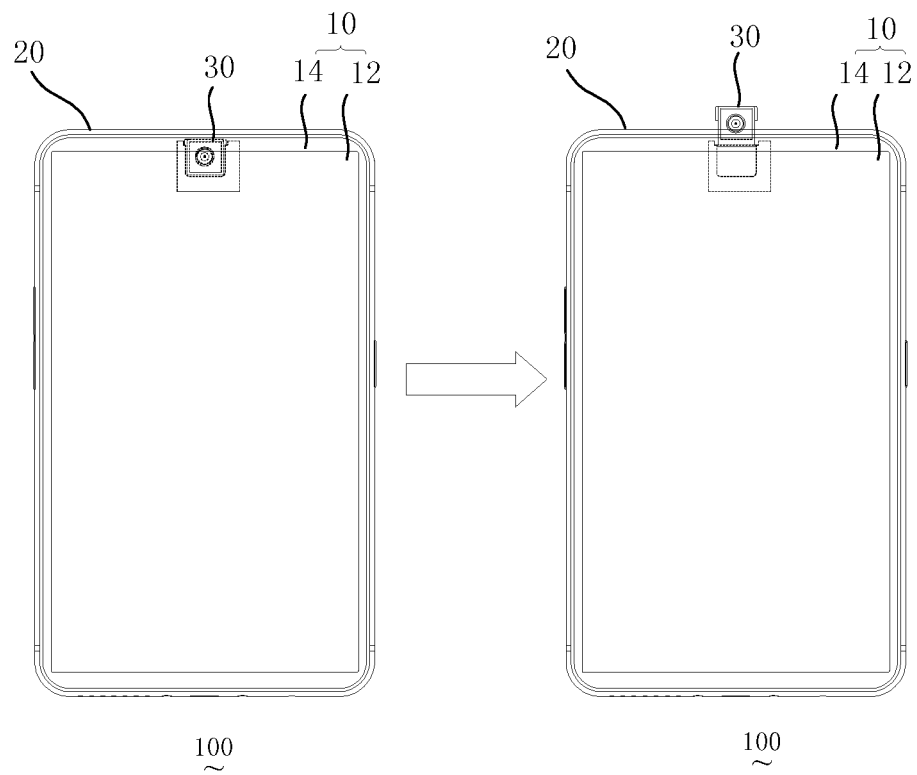
FIG. 9 is a front view of an electronic apparatus according to an embodiment of the present disclosure, wherein the camera module moves from the second position to the first position.
Figure 10:
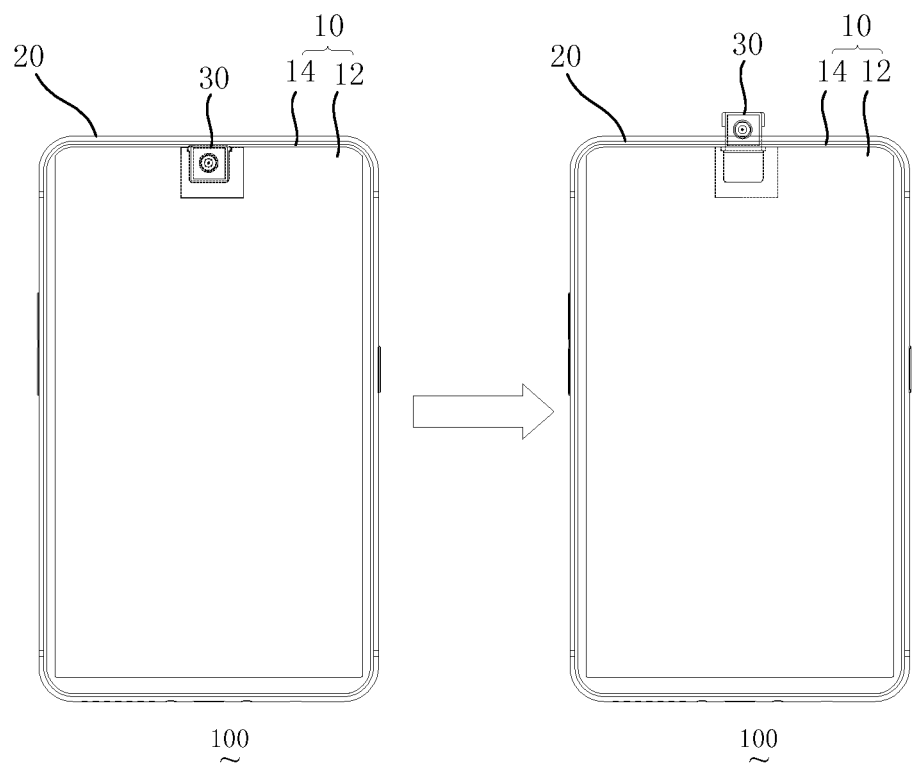
FIG. 10 is a front view of an electronic apparatus according to another embodiment of the present disclosure, wherein the camera module moves from the second position to the first position.

The screen 10, according to an exemplary embodiment, may include a display area 12 configured to display images and information and a non-display area 14 (as shown in FIGS. 9 and 10). In some embodiments, the screen 10 may include pixels formed from light-emitting diodes (LEDs), organic LEDs (OLEDs), plasma cells, electrowetting pixels, electrophoretic pixels, liquid crystal display (LCD) components, or other suitable pixel structures. A screen cover layer (not labeled) such as a layer of clear glass or plastic may cover the surface of the screen 10 or the outermost layer of the screen 10 may be formed from a color filter layer, thin-film transistor layer, or other display layer. In this embodiment, the screen 10 may further incorporate touch electrodes and be used as a touch screen for inputting information.

The housing assembly 20 may include a housing 22 defining an opening 22a and a dustproof plate 24 configured to cover the opening 22a. The housing 22, which may sometimes be referred to as a case, may be formed of plastic, glass, ceramics, fiber composites, metal (e.g., stainless steel, aluminum, etc.), other suitable materials, or a combination of these materials. In some situations, parts of housing 22 may be formed from dielectric or other low-conductivity material.

In some embodiments, the housing 22 may further include a front shell 222 and a back shell 224. The front shell 222 may be fixed on and surround the back shell 224. The back shell 224 may define a chamber 22b configured to receive the camera assembly 30, the controller 40 and other components. The screen 10 may cover the chamber 22b. In an embodiment, the opening 22a may be defined by the back shell 224, in other embodiments, the opening 22a may be defined by the front shell 222.

The dustproof plate 24 may be connected to the housing 22 by a rebound hinge 26 such that the dustproof plate 24 could rotate relative to the housing 22. When the dustproof plate 24 is pushed by an external force, the dustproof plate 24 may rotate to move away from the opening 22a. When the external force disappears, the dustproof plate 24 may be bounced back to cover the opening 22a by a rebound force generated by the rebound hinge 26. The rebound hinge 26 may be a spring, an iron elastic sheet or other elastic parts.

Referring to FIGS. 3 to 6, the camera assembly 30 may include a fixed holder 31 fixed on the back shell 224, a support means 32, a guiding device 33 connecting to the fixed holder 31 and the first support means 32, a camera module 34 arranged on the support means 32 and a second magnetic structure 35 arranged on the fixed holder 31. The support means 32 may be configured to move relative to the fixed holder 31 under the guidance of the guiding device 33, such that the camera module 34 could move between a first position at which the camera module 34 may extend out of the housing 22 and a second position at which the camera module 34 may retract into the housing 22 with movement of the support means 32. The second magnetic structure 35 may be configured to drive the support means 32 to move.

In some embodiments, the fixed holder 31 may be a part of the front shell 222, the back shell 224 or other components of the electronic apparatus 100. In other embodiments, the fixed holder 31 may be a single component of the electronic apparatus 100. The fixed holder 31 may include a base plate 310 substantially parallel to the moving direction of the support means 32, a connecting portion 312 arranged on the fixed holder 31 and configured to connect the fixed holder 31 to the back shell 224, a first guiding plate 314a, a second guiding plate 314b, a first retaining plate 316a and a second retaining plate 316b.

The first guiding plate 314a may extend substantially perpendicularly from an end of the base plate 310. The second guiding plate 314b may extend substantially perpendicularly from the other end of the base plate 310 and opposite to the first guiding plate 314a. The first guiding plate 314a and the second guiding plate 314b may be arranged substantially parallel to the moving direction of the support means 32.

The first retaining plate 316a may extend substantially perpendicularly from an end of the base plate 310 and defining a first opening 31a. The second retaining plate 316b may extend substantially perpendicularly from the other end of the base plate 310 and opposite to the first retaining plate 316a. Both the second retaining plate 316b and the first retaining plate 316a may be arranged substantially perpendicularly to the moving direction of the support means 32. An end of the first retaining plate 316a may be connected to an end of the first guiding plate 314a, the other end of the first retaining plate 316a may be connected to an end of the second guiding plate 314b. An end of the second retaining plate 316b may be connected to the other end of the first guiding plate 314a, the other end of the second retaining plate 316b may be connected to the other end of the second guiding plate 314b.

The first retaining plate 316a may define a first opening 31a, through which the support means 32 could extend out of or retract into the fixed holder 31. The base plate 310 may define a second opening 31*b* communicating with the first opening 31*a*.

Figure 7:
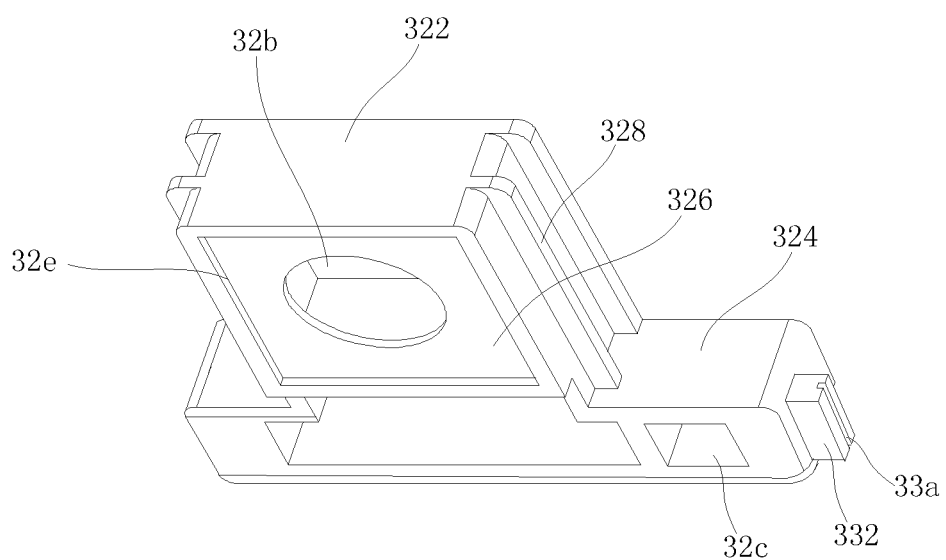
FIG. 7 is an isometric view of the support means in FIG. 2.

Combining with FIG. 7, the support means 32 may include a first magnetic structure 320, a main body 322 defining a first groove 32*a*, two mating bodies 324 arranged on the main body 322. The mating bodies 324 may be arranged opposite to each other and along a direction substantially perpendicular to a moving direction of the support means 32.

The first magnetic structure 320 may be a magnet and arranged on the mating body 324. In some embodiments, the entire support means 32 may be a magnet, that is, the entire support means 32 may be made of magnetic materials, such as, iron, cobalt, nickel or the like. The magnet may be a permanent magnet. In other embodiments, the magnet may be an electromagnet.

The first groove 32*a* may be configured to receive the camera module 34. The main body 322 may include a bottom wall 326 in the first groove 32*a*. The bottom wall 326 may define a through hole 32*b* for light or other signal to penetrate to the camera module 34, such that the camera module 34 could receive light or other signal. For example, the through hole 32*b* may be a light hole for ambient light to pass through and reach the camera. Furthermore, a lens groove 32*e* may be defined by the bottom wall 326, opposite to the first groove 326 and around the through hole 32*b*. A lens (not shown) may be received in the lens groove 32*e*, which could prevent the external impurities, such as, dust, liquid or the like, from entering into the camera module 34.

A plurality of reinforcing ribs 328 may be provided on outer wall of the main body 322. An end of the reinforcing ribs 328 may extend to the mating body 324, which could increase the strength of the support means 32, thereby protecting the support means 32 from being damaged during moving.

One of the mating bodies 324 may be arranged on a surface of the main body 322, the other one of the mating bodies 324 may be arranged on an opposite surface of the main body 322. One of the mating bodies 324 of this embodiment may define a second groove 32*c* configured to receive the first magnetic structure 320.

Figure 8:
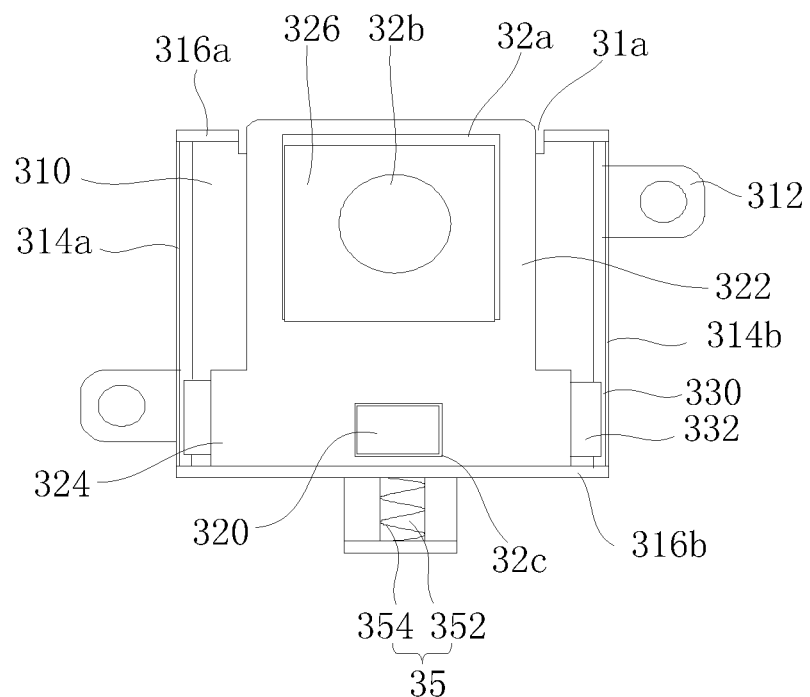
FIG. 8 is a plan view of the fixed holder and the support means according to another embodiment of the present disclosure.

Referring to FIG. 8, according to another embodiment of the present disclosure, the main body 322 may define the second groove 32*c* for receiving the first magnetic structure 320. In particularly, an end of the main body 322 near the second magnetic structure 35 may define the second groove 32*c*. In this way, space occupied by the mating body 324 may be reduced, and thus the volume of the camera assembly 30 could be reduced. Furthermore, it could make direction of magnetic force subjected by the first magnetic structure 320 be more closed to the center of gravity of the support means 32 to arrange the first magnetic structure 320 in the main body 322. As a result, the moving stability of the support means 32 could be increased.

The guiding device 33 may include two guiding rails 330 and two sliding blocks 332 matching with the guiding rails 330. In some embodiments, the guiding rails 330 may be arranged on the base plate 310. In other embodiments, the guiding rails 330 and the base plate 310 may be formed of a single piece. The guiding rails 330 may protrude from and substantially perpendicular to the base plate 310, such that a direction of protruding may be the same as a mould-opening or mould-closing direction during a production process of the fixed holder 31. As a result, the guiding rails 330 may not affect the removing of the fixed holder 31 from the mold. Therefore, a production cost of the fixed holder 31 could be reduced. In still other embodiments, one of the guiding rails 330 may be arranged on the first guiding plates 314*a*, or be formed of a single piece with the first guiding plates 314*a*. The other one of the guiding rails 330 may be arranged on the second guiding plates 314*b*, or be formed of a single piece with the second guiding plates 314*b*.

The sliding blocks 332 may be arranged on the support means 32. In some embodiments, one of the sliding blocks 332 may be fixed on one of the mating bodies 324, the other one of the sliding blocks 332 may be fixed on the other mating bodies 324. The sliding blocks 322 may be configured to slide along the guiding rails 330 to guide the movement of the support means 32. In particularly, each of the sliding blocks 332 may define a guiding groove 33*a* (shown in FIG. 7). The guiding rails 330 may be inserted into the guiding grooves 33*a* (shown in FIG. 4).

In these embodiments, the guiding rails 330 and the sliding blocks 332 may be arranged in width direction of the camera module 34. In this way, thickness of the camera assembly 30 may be reduced, and the electronic apparatus 100 could have a thinner thickness.

In some embodiments, the quantity of the guiding rail 330 may be one or more. The quantity of the sliding block 332 may be equal to that of the guiding rail 330.

The camera module 34 may be arranged in the first groove 32*a*. In some embodiments, a central axis of the camera module 34 and a central axis of the through hole 32*b* may overlap such that the camera module 34 could fully receive external light to take a higher quality image. The camera module 34 may extend out of the housing 22 or retract back into the housing 22 through the first opening 31*a* and the opening 22*a*. Moving direction of the camera module 34 may be parallel to the back shell 14.

Referring to FIGS. 9 to 10, when the camera module 34 is at the first position, the camera module 34 may extend out of the housing 22 and be seen from an outside of the electronic apparatus 100, such that the camera module 34 could be used to achieve its function. In this state, the mating body 324 may abut against the first retaining plate 316*a* to stop the camera module 34 from extending (shown in FIG. 6).

When the camera module 34 is at the second position, the camera module 34 may retract into the housing 22 and further received in the housing 22, such that the camera module 34 could be hided under the screen 10 and cannot be seen from the outside of the electronic apparatus 100. In this way, it is possible to achieve a diversity of usages of the electronic apparatus 100, and improve the user experience. In this state, the mating body 324 may abut against the second retaining plate 316*b* to stop the camera module 34 from retracting (shown in FIG. 5). When the camera module 34 is at the second position, the camera module 34 may be disposed under the display area 12 of the screen 10, such that at least part of the camera module 34 may be covered by the screen 10.

When the camera module 34 is at the second position, in some embodiment, part of the camera module 34 may be covered by the display area 12 of the screen 10, the other part of the camera module 34 may be covered by the non-display area 14 of the screen 10 (shown in FIG. 9). In other embodiments, whole of the camera module 34 may be covered by the display area 122 of the screen 10 (shown in FIG. 10).

Since the camera module 34 is disposed in the housing 22 and under the screen 10, the camera module 34 may no longer occupy any space of the display area 12, such that the display area 12 could be designed as large as possible, and thus a ratio of the display area 12 to a total area of the screen 10 could be increased. In addition, the volume of the electronic apparatus 100 could be reduced, thereby carrying or gripping the electronic apparatus 100 could be more convenient.

In particularly, when the camera module 34 is at the second position, part of the support means 32 may be received in the second opening 31b. Furthermore, the support means 32 may protrude relative to the base plate 310 through the second opening 31b. Therefore, the thickness of the fixed holder 31 could be thinner than that of the support means 32. As a result, the space occupied by the camera assembly 30 could be reduced.

The second magnetic structure 35 may be an electromagnet fixed on the second retaining plate 316b, arranged corresponding to the first magnetic structure 320 and electrically connected to the controller 40. The second magnetic structure 35 and the first magnetic structure 320 may be arranged along the moving direction of the camera module 34.

The electromagnet may include an iron core 352 and a conductive coil 354 wrapping around the iron core 352. The iron core 352 may have a configuration of a bar or a horseshoe, such that the iron core 352 could be magnetized more easily. Therefore, the iron core 352 could generate a stronger magnetic field when provided with a same amount of current. The iron core 352 may be made of soft iron or silicon steel material, such that the second magnetic structure 35 could be demagnetized immediately at the time when current provided to the second magnetic structure 35 disappears, and that magnetic poles of the second magnetic structure 35 could exchange immediately at the time when the controller 40 change the direction of the current. As a result, the stability and accuracy of the sliding of the camera module 34 could be improved.

The controller 40 may be configured to control direction of current provided to the electromagnet, so as to exchange magnetic poles of the electromagnet.

For example, the magnetic poles of the first magnetic structure 320 may be S-N along the moving direction of the camera module 34. When the camera module 34 is at the second position, the camera module 34 may be positioned between the first retaining plate 316a and the second retaining plate 316b. When the user inputs an instruction of starting the camera module 34, the controller 40 may control direction of current provided to the second magnetic structure 35 to be a first direction, such that the magnetic poles of the second magnetic structure 35 may be N-S along the moving direction of the camera module 34. That is, the magnetic pole of the second magnetic structure 35 faced to the first magnetic structure 320 may be the same as the magnetic pole of the first magnetic structure 320 faced to the second magnetic structure 35. Therefore, the first magnetic structure 320 may be repulsed to the second magnetic structure 35 and driven to move away from the second magnetic structure 35. As a result, the camera module 34 may be driven to move away from the second magnetic structure 35 along the guiding rails 330, and the camera module 34 may be forced to the first position.

After using the camera module 34, the user may input an instruction of turning off the camera module 34, the controller 40 may change direction of current provided to be a second direction reversing to the first direction, such that the magnetic poles of the second magnetic structure 35 may be S-N along the moving direction of the camera module 34. That is, the magnetic pole of the second magnetic structure 35 faced to the first magnetic structure 320 may be different from the magnetic pole of the first magnetic structure 320 faced to the second magnetic structure 35. Therefore, the first magnetic structure 320 may be attracted to the second magnetic structure 35 and driven to move toward the second magnetic structure 35. As a result, the camera module 34 may be driven to move toward the second magnetic structure 35 along the guiding rails 330, and the camera module 34 may be pulled to the second position.

In some embodiments, the camera module 34 may be kept at the first position by repulsive force generated between the first magnetic structure 320 and the second magnetic structure 35. The camera module 34 may be kept at the second position by attractive force generated between the first magnetic structure 320 and the second magnetic structure 35.

In addition, the controller 40 could further control the amount of the current provided to the second magnetic structure 35, so as to control the magnitude of the magnetic force between the second magnetic structure 35 and the first magnetic structure 320. Therefore, camera module 34 could be controlled to be at any position between the first position and the second position by controlling the magnitude of the magnetic force.

Figure 11:
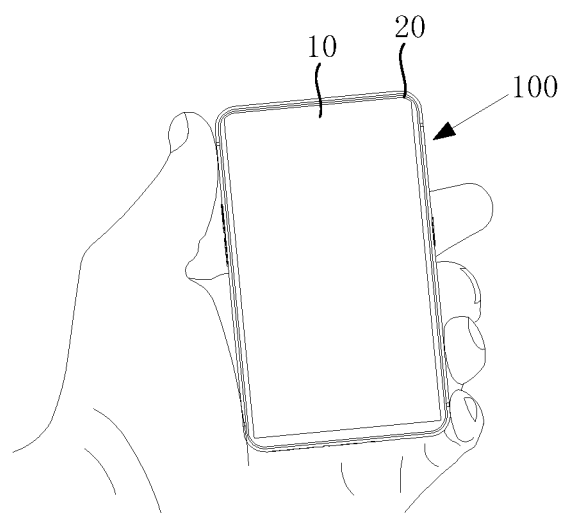
FIG. 11 is a schematic view of an electronic apparatus according to a further embodiment of the present disclosure, wherein the camera module is at the second position.
Figure 12:
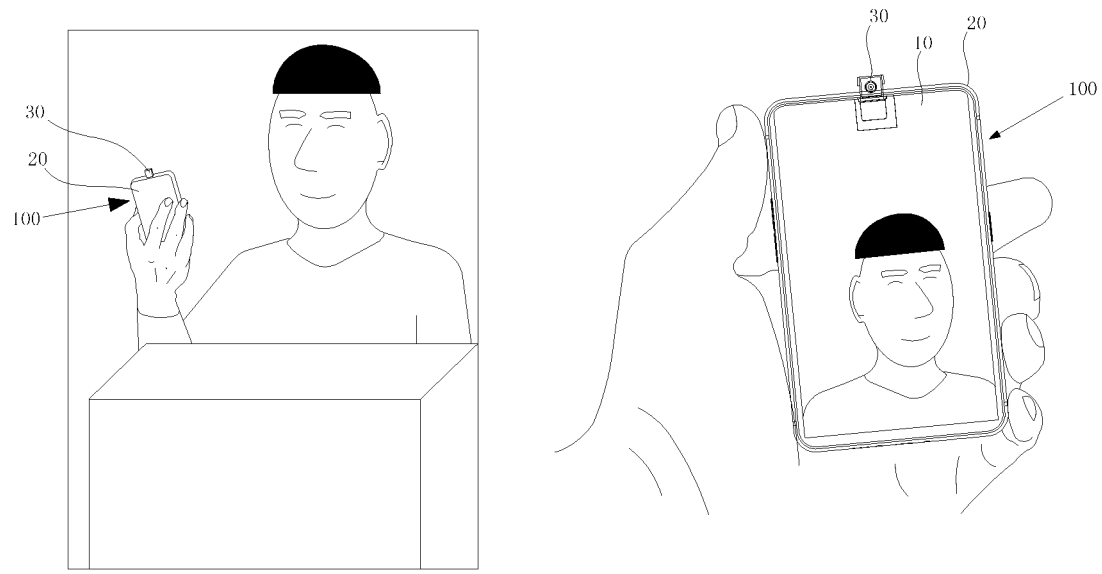
FIG. 12 is a schematic view of an electronic apparatus according to an embodiment of the present disclosure, wherein the module is being used to take images and at the first position.

Take the camera for taking pictures as an example, referring to FIG. 11, when the camera module 34 is not being used, the camera assembly 30 may be disposed in the housing 22 and hided under the screen 10. When a user wants to take images, he may input an instruction of taking images to the electronic apparatus 100. Then the camera module 34 may be driven to extend out of the housing 22 by the second magnetic structure 35 via the opening 22a, an image taking function may be achieved as a result, as shown in FIG. 12. The camera module 34 will not occupy the space of the screen 10, and it is unnecessary to define a hole for the camera module 34 on the cover layer of the screen 10. In this way, a ratio of the display area 12 to an area of the screen 10 may be increased, and manufacturing processes of the screen 10 may be reduced. After finishing taking images, the second magnetic structure 35 may drive the camera module 34 to retract into the housing 22 via the opening 22a, and thus the camera module 34 may be protected from being impacted, damaged, eroded by water or dust, and the like.

Figure 13:
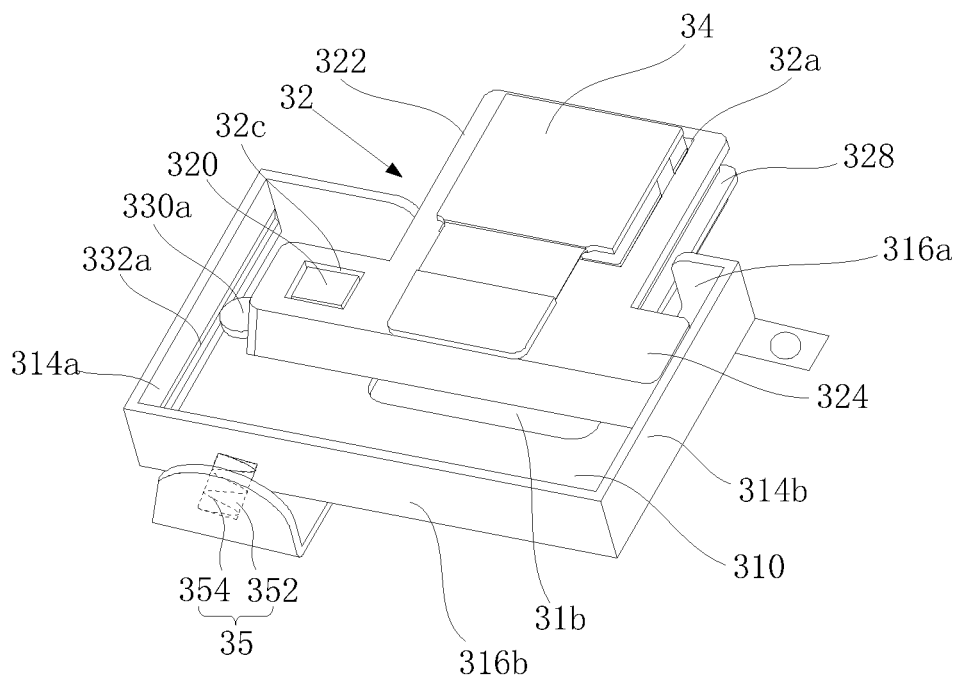
FIG. 13 is a schematic view of the camera assembly of the electronic apparatus according to another embodiment of the present disclosure.

Referring to FIG. 13, in some embodiments, the guiding device 33b may further include a roller 330a rotatably connected to one of the mating bodies 324 adjacent to the first guiding plate 314a and a guiding slot 332a defined by the first guiding plate 314a. The sliding block 332 may be arranged on the other one of the mating bodies 324 adjacent to the second guiding plate 314b, the guiding rail 330 may be arranged on the second guiding plate 314b. The roller 330a may roll in the guiding slot 332a to guide the movement of the support means 32, such that sliding stability of the support means 32 could be improved. Since a friction between the roller 330a and the guiding slot 332a is a rolling friction and magnitude of the rolling friction may be smaller than that of a sliding friction, energy loss may be effectively reduced.

In some embodiments, the quantity of the roller 330a may be two, and the quantity of the guiding slot 332a may also be two. Two rollers 330a mating with two guiding slot 332a could improve the sliding stability of the support means 32 without occupying too much space. In other embodiments, each of the guiding slots 332a may mate with two or more rollers 330a. In still other embodiment, the quantity of the guiding slots 332a may be two or more, which is not limited herein.

In an embodiment, the guiding slot 332a may be defined by the base plate 310. In other embodiments, the guiding slot 332a may be defined at least by the first guiding plate 314a or the second guiding plate 314b.

Figure 14:
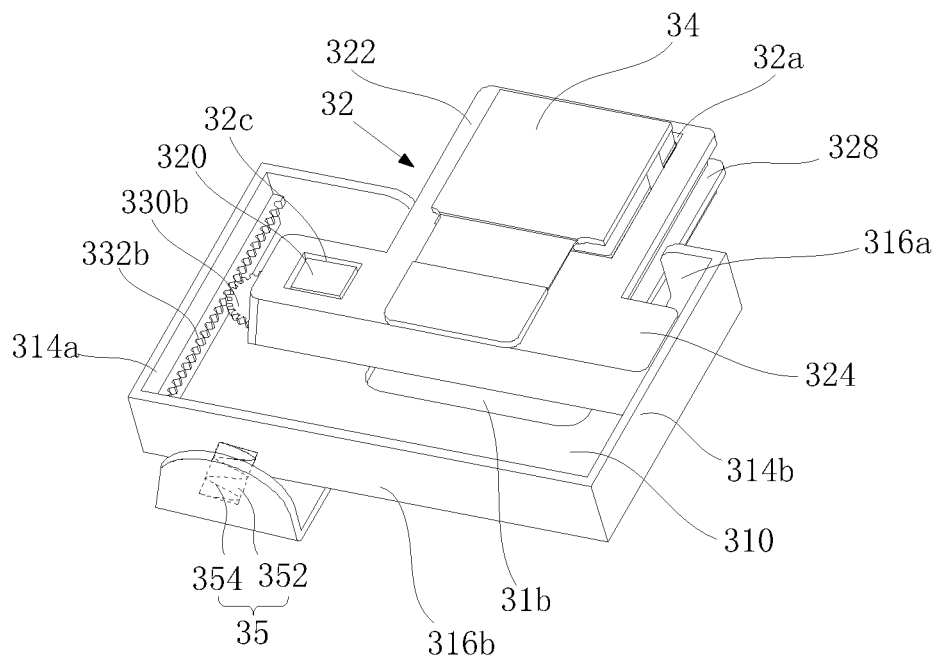
FIG. 14 is a schematic view of the camera assembly of the electronic apparatus according to still another embodiment of the present disclosure.

Referring to FIG. 14, in still other embodiments, the guiding device 33c may further include a gear 330c rotatably connected to one of the mating bodies 324 adjacent to the first guiding plate 314a and a rack 332c arranged on the first guiding plate 314a. The sliding block 332 may be arranged on the other one of the mating bodies 324 adjacent to the second guiding plate 314b, the guiding rail 330 may be arranged on the second guiding plate 314b. The gear 330c and the rack 332c may mesh with each other and roll on the rack 332c to guide the movement of the support means 32, such that sliding stability of the support means 32 could be improved. Since the gear 330c and the rack 332c have a surface contact, and each of the projections of the rack 332c or the gear 330c may be engaged into a groove between two adjacent projections of the gear 330c or the rack 332c, the gear 330c may roll on the rack 332c more stably. The engagement between the gear 330c and the rack 332c could prevent the support means 32 continuing sliding under the condition that the disappearance of the magnetism delays, which could improve the user experience.

In some embodiments, the quantity of the gears 330c may be two, and the quantity of the racks 332c may also be two. The two gears 330c may be arranged opposite to each other. In other embodiment, each of the racks 332c may mate with two or more gears 330c. In still other embodiments, the quantity of the racks 332c may be two or more, which is not limited herein.

In an embodiment, the rack 332c may be arranged on the base plate 310. In other embodiments, both of the first guiding plate 314a and the second guiding plate 314b may be provided with the rack 332c.

Figure 15:
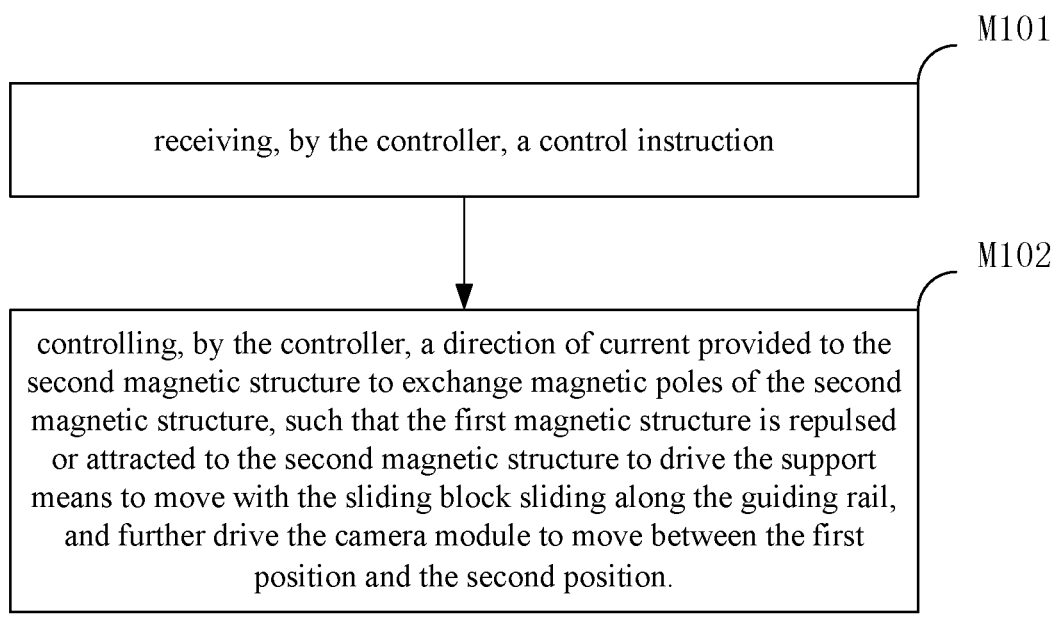
FIG. 15 is a flow chart diagram of a method for controlling a camera assembly of an electronic apparatus according to an embodiment of the present disclosure.

Referring to FIG. 15, the present disclosure may further provide a method for controlling a camera assembly of an electronic apparatus. The electronic apparatus may be any one of the electronic apparatus mentioned above, the details are not recited herein.

In an embodiments, the method may include:

M101: receiving, by the controller, a control instruction.

At the block M101, the control instruction may include a start-taking pictures instruction, a stop-taking pictures instruction, a start-video chat instruction, a stop-video chat instruction, a start-videotaping instruction, a stop-videotaping instruction or other instruction executed by the camera module.

M102: controlling, by the controller, a direction of current provided to the second magnetic structure to exchange magnetic poles of the second magnetic structure, such that the first magnetic structure is repulsed or attracted to the second magnetic structure to drive the support means to move with the sliding block sliding along the guiding rail, and further drive the camera module to move between the first position and the second position.

Figure 4:
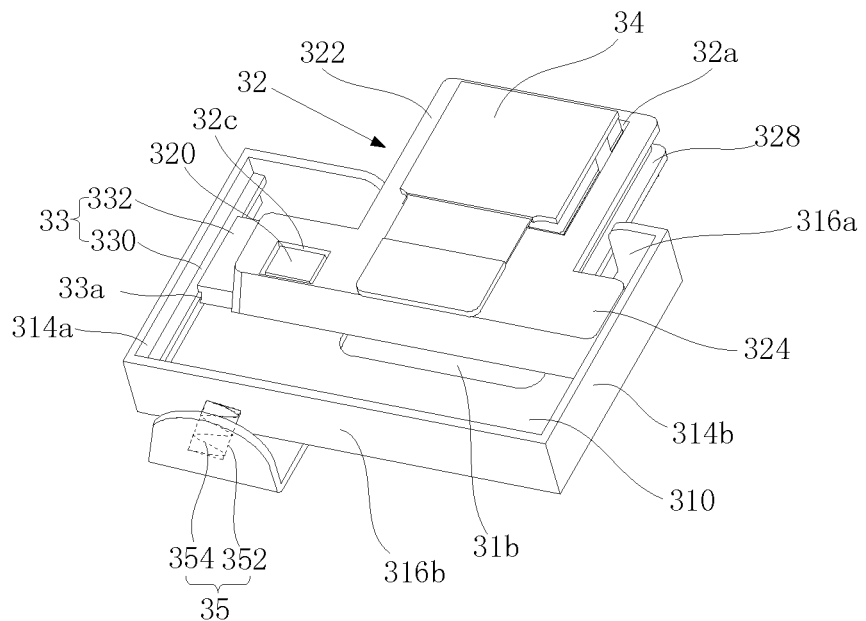
FIG. 4 is a schematic view of the camera assembly of another viewing angle of FIG. 3.
Figure 5:
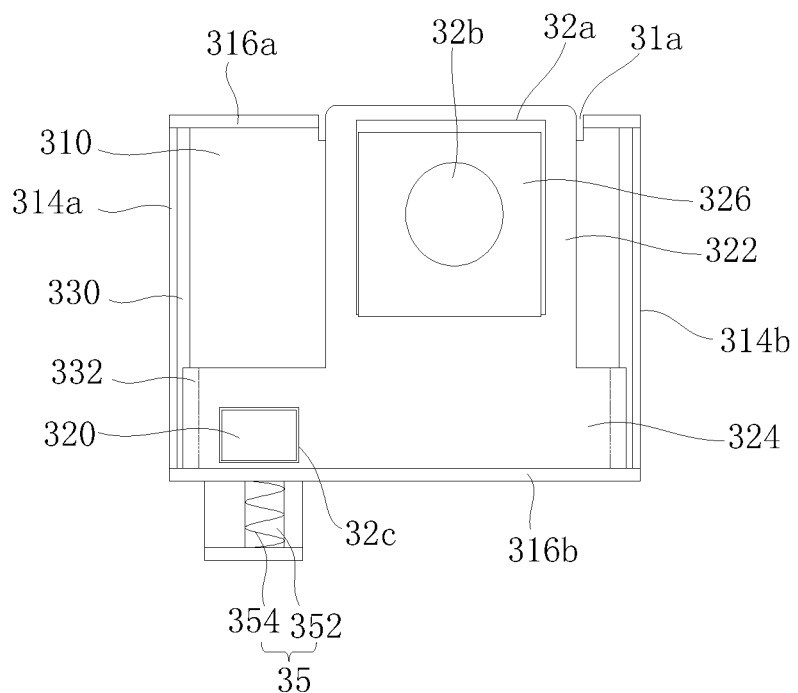
FIG. 5 is a plan view of a fixed holder and a support means of the electronic apparatus according to an embodiment of the present disclosure.
Figure 6:
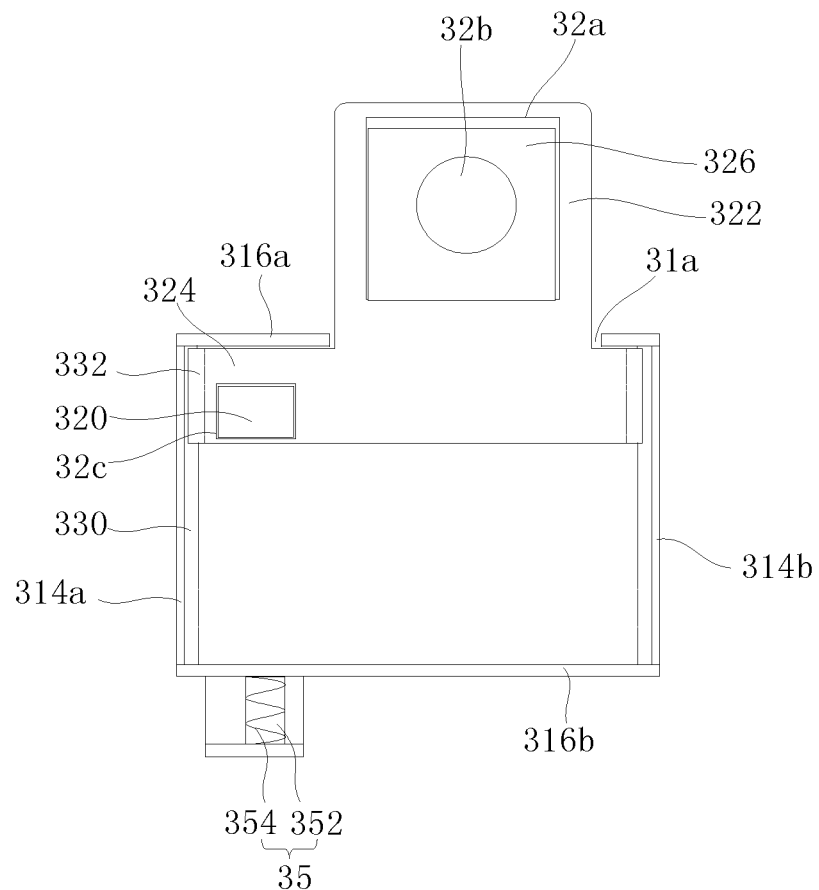
FIG. 6 is a plan view of the fixed holder and the support means in FIG. 5, wherein the support means is at another position.

For example, when the controller receives a start-taking pictures instruction, the controller may control the direction of the current such that the second magnetic structure may generate a repulsive force to the first magnetic structure. Therefore, the first magnetic structure may be forced to move away from the second magnetic structure. The movement of the first magnetic structure may drive the support means 32 to move. And then, the sliding blocks 332 may slide along the guiding rails 330 (as shown in FIG. 4), or the roller 330a may roll on the guiding slot 332a (as shown in FIG. 13), or the gear 330c may roll on the rack 332c (as shown in FIG. 14), so as to guide the support means 32 to move, and thus the camera module 34 arranged on the support means 32 could move from the second position to the first position with the movement of the support means 32.

According to an aspect of the present disclosure, a camera assembly may be provided. The camera assembly may include a fixed holder, a support means including a first magnetic structure and configured to move relative to the fixed holder; a guiding rail arranged on the fixed holder; a sliding block arranged on the support means and configured to slide along the guiding rail to guide movement of the support means; a camera module arranged on the support means and configured to move between a first position at which the camera module extends out of the fixed holder and a second position at which the camera module retracts into the fixed holder with the movement of the support means; and a second magnetic structure, arranged on the fixed holder and configured to generate repulsive force and attractive force to the first magnetic structure to drive the support means to move, such that the camera module moves between the first position and the second position.

In some embodiments, the support means may include a main body defining a first groove configured to receive the camera module; and a mating body arranged on the main body and configured to stop the support means from moving when the camera module is at the first position or at the second position, the sliding block is connected to the mating body.

In other embodiments, a quantity of the mating body may be two, the mating bodies may be arranged opposite to each other and along a direction substantially perpendicular to a moving direction of the of the support means. A quantity of the sliding block may be two, one of the sliding blocks may be connected to one of the mating bodies, the other one of the sliding blocks may be connected to the other one of the mating bodies.

In still other embodiments, a quantity of the guiding rail may be two, a quantity of the sliding block may be two. The fixed holder may include a base plate substantially parallel to the moving direction of the support means, a first guiding plate extending substantially perpendicularly from an end of the base plate; and a second guiding plate extending substantially perpendicularly from the other end of the base plate and opposite to the first guiding plate. The first guiding plate and the second guiding plate may be substantially parallel to the moving direction of the support means, one of the guiding rails may be arranged on the first guiding plate, and the other one of the guiding rails may be arranged on the second guiding plate.

In further other embodiments, the fixed holder may further include a base plate substantially parallel to the moving direction of the support means, a first retaining plate extending substantially perpendicularly from an end of the base plate and defining a first opening, and a second retaining plate extending substantially perpendicularly from the other end of the base plate and opposite to the first retaining plate. Both the second retaining plate and the first retaining plate may be arranged substantially perpendicularly to the moving direction of the support means, the camera module may be configured to extend out of or retract into the fixed holder through the first opening.

In some embodiments, when the camera module is at the first position, the mating body may abut against the first retaining plate to stop the camera module from extending; when the camera module is at the second position, the mating body may abut against the second retaining plate to stop the camera module from retracting.

In other embodiments, the base plate may define a second opening communicating with the first opening, the camera module may protrude relative to the base plate through the second opening.

In still other embodiments, the first magnetic structure may be a magnet. The mating body may define a second groove, the magnet may be received in the second groove, the second magnetic structure and the magnet may be arranged along the moving direction of the support means.

In further other embodiments, the main body may define a second groove, the first magnetic structure may be received in the second groove, the second magnetic structure and the first magnetic structure may be arranged along a moving direction of the support means.

In some embodiments, the main body may include a bottom wall in the first groove, the bottom wall may define a through hole for light to penetrate to enter the camera module.

In some embodiments, the fixed holder may include a base plate substantially parallel to the moving direction of the support means, a first guiding plate extending substantially perpendicularly from an end of the base plate, and a second guiding plate extending substantially perpendicularly from the other end of the base plate and opposite to the first guiding plate. The first guiding plate and the second guiding plate may be substantially parallel to the moving direction of the support means. The guiding rail may be arranged on the first guiding plate. The sliding block may be arranged on one of the mating bodies adjacent to the first guiding plate. A rack may be arranged on the second guiding plate, a gear meshing with the rack may be rotatably connected to the other one of the mating bodies adjacent to the second guiding plate, such that the gear may rotate on the rack to guide the movement of the support means.

In some embodiments, the fixed holder may include a base plate substantially parallel to the moving direction of the support means, a first guiding plate extending substantially perpendicularly from an end of the base plate, and a second guiding plate extending substantially perpendicularly from the other end of the base plate and opposite to the first guiding plate. The first guiding plate and the second guiding plate may be substantially parallel to the moving direction of the support means. The guiding rail may be arranged on the first guiding plate. The sliding block may be arranged on one of the mating bodies adjacent to the first guiding plate. A guiding slot may be defined by the second guiding plate, a roller mating with the guiding slot may be rotatably connected to the other one of the mating bodies adjacent to the second guiding plate, such that the roller may roll in the guiding slot to guide the movement of the support means.

In other embodiments, a lens groove may be defined by the bottom wall opposite to the first groove and around the through hole, the camera assembly may further include a lens received in the lens groove and configured to cover the through hole.

In still other embodiments, the fixed holder may include a base plate substantially parallel to a moving direction of the support means, the guiding rail may be arranged on the base plate.

In further other embodiments, the camera module may be kept at the first position by the repulsive force; and the camera module may be kept at the second position by the attractive force.

In still further other embodiments, the second magnetic structure may be an electromagnet.

According to another aspect of the present disclosure, an electronic apparatus may be provided. The electronic apparatus may include a housing, a screen embedded in the housing, a fixed holder fixed in the housing, a support means including a magnet and configured to move relative to the fixed holder, a guiding rail arranged on the fixed holder, a sliding block arranged on the support means and configured to slide along the guiding rail to guide the movement of the support means, a camera module arranged on the support means and configured to move between a first position at which the camera module extends out of the housing and a second position at which the camera module retracts into the fixed holder with movement of the support means, an electromagnet arranged on the housing and a controller arranged in the housing. The controller may be electrically connected to the electromagnet and configured to control a direction of current provided to the electromagnet to exchange magnetic poles of the electromagnet, such that the magnet may be repulsed or attracted to the electromagnet to drive the support means to move, and further drive the camera module to move between the first position and the second position.

In some embodiments, the housing may define an opening through which the camera module extends out or retract into the housing, e a dustproof plate may be connected to the housing and configured to cover the opening when the camera module is at the second position.

In other embodiments, the dustproof plate may be connected to the housing by a rebound hinge, when the camera module is at the first position, the dustproof plate may be pushed by the support means, when the camera module is at the second position, the dustproof plate may be bounced back to cover the opening.

In still other embodiments, the support means may include a main body defining a first groove configured to receive the camera module and a mating body arranged on the main body and configured to stop the support means from moving when the camera module is at the first position or at the second position. The sliding block may be connected to the mating body.

In further other embodiments, the camera module may be kept at the first position by the repulsive force; and the camera module may be kept at the second position by the attractive force.

According to another aspect of the present disclosure, a mobile terminal may include a front shell; a back shell connected to the front shell; a screen embedded in the front shell and covering the back shell; a fixed holder fixed on the back shell; a support means including a first magnetic structure and configured to move relative to the fixed holder; a guiding rail arranged on the a side of the fixed holder; a rack arranged on the other side of the fixed holder; a sliding block arranged on the support means; a gear meshing with the rack and rotatably connected to the support means, the sliding block may be configured to slide along the guiding rail and the gear may be configured to rotate along the rack to guide the movement of the support means; a camera module arranged on the support means and configured to move between a first position at which the camera module extends out of the housing and a second position at which the camera module retracts into the housing with movement of the support means and a second magnetic structure arranged on the fixed holder and configured to generate repulsive force and attractive force to the first magnetic structure to drive the support means to move, such that the camera module may move between the first position and the second position.

For one skilled in the art, it is clear that the present application is not limited to the details of the above exemplary embodiments, and that the present application can be implemented in other specific forms without deviating from the spirit or basic characteristics of the application. Therefore, at any point, the embodiments should be regarded as exemplary and unrestrictive, and the scope of the present application is defined by the appended claims, rather than the above description. Therefore, all changes within the meaning and scope of the equivalent elements of the claim is intended to be included. Any appended label recited in the claims shall not be regarded as a limitation to the claims. In addition, apparently, the terms "include", "comprise" and the like do not exclude other units or steps, and the singular does not exclude plural.

It should be noted that, the foregoing disclosed is merely exemplary implementations and it is not intended to limit the scope of the present disclosure. Although the present disclosure is described in details with reference to the above embodiments, however, one skilled in the art may make any modification or equivalence based on the technical solution and the inventive concept of the present disclosure. All these modifications and equivalences shall all be covered within the protection claimed in the claims of the present disclosure.

What is claimed is:

1. A camera assembly, comprising:
a fixed holder;
a support means, comprising a first magnetic structure and configured to move relative to the fixed holder;
a guiding rail, arranged on the fixed holder;
a sliding block, arranged on the support means and configured to slide along the guiding rail to guide movement of the support means;
a camera module, arranged on the support means and configured to move between a first position at which the camera module extends out of the fixed holder and a second position at which the camera module retracts into the fixed holder with the movement of the support means; and
a second magnetic structure, arranged on the fixed holder and configured to generate repulsive force and attractive force to the first magnetic structure to drive the support means to move, such that the camera module moves between the first position and the second position.

2. The camera assembly according to claim 1, wherein the support means comprises:
a main body, defining a first groove configured to receive the camera module; and
a mating body, arranged on the main body and configured to stop the support means from moving when the camera module is at the first position or at the second position, wherein the sliding block is connected to the mating body.

3. The camera assembly according to claim 2, wherein a quantity of the mating body is two, the mating bodies are arranged opposite to each other and along a direction substantially perpendicular to a moving direction of the support means.

4. The camera assembly according to claim 3, wherein a quantity of the guiding rail is two, a quantity of the sliding block is two, one of the sliding blocks is connected to one of the mating bodies, the other one of the sliding blocks is connected to the other one of the mating bodies;
the fixed holder comprises:
a base plate, substantially parallel to the moving direction of the support means;
a first guiding plate, extending substantially perpendicularly from an end of the base plate; and
a second guiding plate, extending substantially perpendicularly from the other end of the base plate and opposite to the first guiding plate;
wherein the first guiding plate and the second guiding plate are substantially parallel to the moving direction of the support means, one of the guiding rails is arranged on the first guiding plate, the other one of the guiding rails is arranged on the second guiding plate.

5. The camera assembly according to claim 3, wherein the fixed holder further comprises:
a base plate, substantially parallel to the moving direction of the support means;
a first retaining plate, extending substantially perpendicularly from an end of the base plate and defining a first opening; and
a second retaining plate, extending substantially perpendicularly from the other end of the base plate and opposite to the first retaining plate;
wherein both the second retaining plate and the first retaining plate are arranged substantially perpendicularly to the moving direction of the support means, the second magnetic structure is fixed on the second retaining plate, the camera module is configured to extend out of or retract into the fixed holder through the first opening.

6. The camera assembly according to claim 5, wherein when the camera module is at the first position, the mating bodies abut against the first retaining plate to stop the camera module from extending; when the camera module is at the second position, the mating bodies abut against the second retaining plate to stop the camera module from retracting.

7. The camera assembly according to claim 5, wherein the base plate defines a second opening communicating with the first opening, the camera module protrudes relative to the base plate through the second opening.

8. The camera assembly according to claim 2, wherein the first magnetic structure is a magnet;
the mating body defines a second groove, the magnet is received in the second groove, the second magnetic structure and the magnet are arranged along a moving direction of the support means.

9. The camera assembly according to claim 2, wherein the main body defines a second groove, the first magnetic structure is received in the second groove, the second magnetic structure and the first magnetic structure are arranged along a moving direction of the support means.

10. The camera assembly according to claim 2, wherein the main body comprises a bottom wall in the first groove, the bottom wall defines a through hole for light to penetrate to enter the camera module.

11. The camera assembly according to claim 3, wherein the fixed holder comprises:
a base plate, substantially parallel to the moving direction of the support means;
a first guiding plate, extending substantially perpendicularly from an end of the base plate; and
a second guiding plate, extending substantially perpendicularly from the other end of the base plate and opposite to the first guiding plate, wherein the first guiding plate and the second guiding plate are substantially parallel to the moving direction of the support means;

the guiding rail is arranged on the first guiding plate, the sliding block is arranged on one of the mating bodies adjacent to the first guiding plate;

a rack is arranged on the second guiding plate, a gear meshing with the rack is rotatably connected to the other one of the mating bodies adjacent to the second guiding plate, such that the gear rotates on the rack to guide the movement of the support means.

12. The camera assembly according to claim 3, wherein the fixed holder comprises:

a base plate, substantially parallel to the moving direction of the support means;

a first guiding plate, extending substantially perpendicularly from an end of the base plate; and a second guiding plate, extending substantially perpendicularly from the other end of the base plate and opposite to the first guiding plate, wherein the first guiding plate and the second guiding plate are substantially parallel to the moving direction of the support means;

the guiding rail is arranged on the first guiding plate, the sliding block is arranged on one of the mating bodies adjacent to the first guiding plate;

a guiding slot is defined by the second guiding plate, a roller mating with the guiding slot is rotatably connected to the other one of the mating bodies adjacent to the second guiding plate, such that the roller rolls in the guiding slot to guide the movement of the support means.

13. The camera assembly according to claim 1, wherein the fixed holder comprises a base plate substantially parallel to a moving direction of the support means, the guiding rail is arranged on the base plate.

14. The camera assembly according to claim 1, wherein the camera module is kept at the first position by the repulsive force; and the camera module is kept at the second position by the attractive force.

15. The camera assembly according to claim 1, wherein the first magnetic structure is a magnet, the second magnetic structure is an electromagnet, the magnet is repulsed or attracted by the electromagnet through exchanging magnetic poles of the electromagnet.

16. An electronic apparatus, comprising:

a housing;

a screen, embedded in the housing;

a fixed holder, fixed in the housing;

a support means, comprising a magnet and configured to move relative to the fixed holder;

a guiding rail, arranged on the fixed holder;

a sliding block, arranged on the support means and configured to slide along the guiding rail to guide the movement of the support means;

a camera module, arranged on the support means and configured to move between a first position at which the camera module extends out of the housing and a second position at which the camera module retracts into the fixed holder with movement of the support means;

an electromagnet, arranged on the fixed holder; and a controller, arranged in the housing, electrically connected to the electromagnet and configured to control a direction of current provided to the electromagnet to exchange magnetic poles of the electromagnet, such that the magnet is repulsed or attracted to the electromagnet to drive the support means to move, and further drive the camera module to move between the first position and the second position.

17. The electronic apparatus according to claim 16, wherein the housing defines an opening through which the camera module extends out or retracts into the housing;

a dustproof plate is connected to the housing and configured to cover the opening when the camera module is at the second position.

18. The electronic apparatus according to claim 17, wherein the dustproof plate is connected to the housing by a rebound hinge, when the camera module is at the first position, the dustproof plate is pushed by the support means, when the camera module is at the second position, the dustproof plate is bounced back to cover the opening.

19. The electronic apparatus according to claim 16, wherein the support means comprises:

a main body, defining a first groove configured to receive the camera module; and a mating body, arranged on the main body and configured to stop the support means from moving when the camera module is at the first position or at the second position, wherein the sliding block is connected to the mating body.

20. A mobile terminal, comprising:

a front shell;

a back shell, connected to the front shell;

a screen, embedded in the front shell and covering the back shell;

a fixed holder, fixed on the back shell;

a support means, comprising a first magnetic structure and configured to move relative to the fixed holder;

a guiding rail, arranged on a side of the fixed holder;

a rack arranged on another side of the fixed holder;

a sliding block, arranged on the support means;

a gear, meshing with the rack and rotatably connected to the support means, wherein the sliding block is configured to slide along the guiding rail and the gear is configured to rotate along the rack to guide the movement of the support means;

a camera module, arranged on the support means and configured to move between a first position at which the camera module extends out of a housing and a second position at which the camera module retracts into the housing with movement of the support means;

a second magnetic structure, arranged on the fixed holder and configured to generate repulsive force and attractive force to the first magnetic structure to drive the support means to move, such that the camera module moves between the first position and the second position; and a controller, received in a chamber defined by the back shell, electrically connected to the second magnetic structure and configured to control a direction of current provided to the second magnetic structure to exchange magnetic poles of the second magnetic structure, such that the first magnetic structure is repulsed or attracted to the second magnetic structure to drive the support means to move, and further drive the camera module to move between the first position and the second position.

* * * * *